June 6, 1933.  A. W. WOODWARD  1,913,351

VEHICLE WHEEL MOUNTING

Filed April 8, 1929

Inventor
Alva W. Woodward.

Attorney

Patented June 6, 1933

1,913,351

UNITED STATES PATENT OFFICE

ALVA W. WOODWARD, OF AKRON, OHIO, ASSIGNOR TO THE GOODYEAR TIRE & RUBBER COMPANY, OF AKRON, OHIO, A CORPORATION OF OHIO

VEHICLE WHEEL MOUNTING

Application filed April 8, 1929. Serial No. 353,378.

This invention relates to vehicle wheel mountings and it has particular relation to a vehicle wheel mounting which is adapted to support a plurality of resilient tires.

The object of the invention is to provide an improved form of spacing member for relatively spacing the rims in dual tire assemblies in such manner that the elements of the construction can be easily mounted on or demounted from the wheel.

In the mounting of dual rims upon a vehicle wheel, it is important that the rims be maintained in uniformly spaced relation. In some dual rim mountings in which the rims have inclined seating faces on their inner peripheries resting upon the inclined supporting surface of the wheel, a spacing band or ring is employed between the rims in order to maintain them in spaced relation. Heretofore some of the spacing members employed did not maintain a concentric relation with the outer periphery of the wheel. Consequently, the rims and spacing members were secured in a more or less unstable position or were out of alignment with the wheel. This condition caused uneven wear on the tire. There are known types of spacing rings or bands that engage the rims and maintain a concentric relation with the outer periphery of the wheel but in applying these bands about a wheel, a pressing machine is required or, if mounted manually, a tedious operation is required for forcing the spacing member over the felloe of the wheel by pounding it with a heavy hammer. By employing either of these methods, the spacing band is likely to be buckled inwardly or enlarged thereby rendering it very difficult to remove the band from the wheel when it becomes necessary to replace the inner tire on a dual rim mounting.

According to this invention, a split spacing band is employed between dual rims. It rests substantially upon a supporting structure such as a wheel felloe and is provided with portions engaging the rims for supporting the rims in spaced relation. The spacing band includes a latching device for facilitating the operation of placing the band upon or removing it from the supporting structure of the wheel.

For a better understanding of the invention, reference may now be had to the accompanying drawing, forming a part of the specification, in which.

Figure 1:
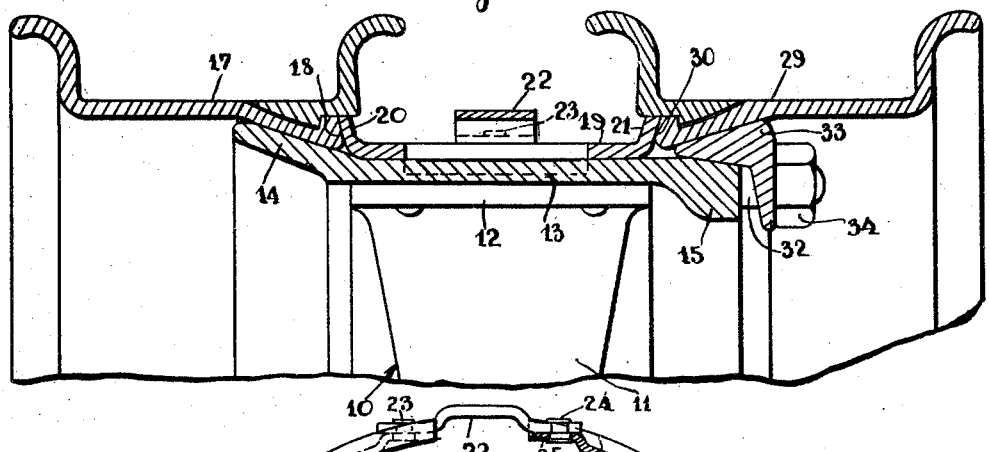
Fig. 1 is a fragmentary cross-sectional view of a dual rim mounting embodying the principles of my invention.
Figure 2:
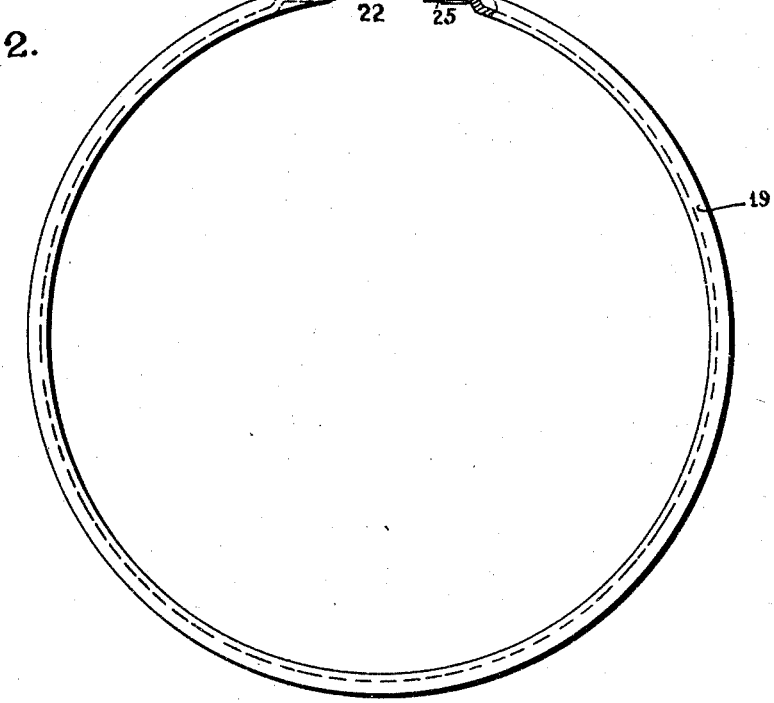
Fig. 2 is a side elevational view of a split spacing member.

In practicing the invention, a wheel 10 is provided that includes spokes 11 and a felloe 12 secured thereto by any suitable means. The felloe has a cylindrical base portion 13 on its inner side and has an inclined portion 14. The outer edge of the felloe is formed into an enlarged portion 15.

An inner rim 17, having a radially outwardly extending flange or abutment 18, is placed upon the inner portion 14 of the felloe. A split spacing member 19 rests upon the cylindrical base portion 13 of the felloe and has substantially radial outwardly extending flanges 20 and 21. A latch 22 is employed to secure the ends of the spacing band 19. The latch is pivotally mounted adjacent one end of the spacing band upon a pin 23 and at the other end a pin 24 is secured to the latch and disposed within an angular slot 25 provided adjacent the other end of the spacing member.

Figure 3:
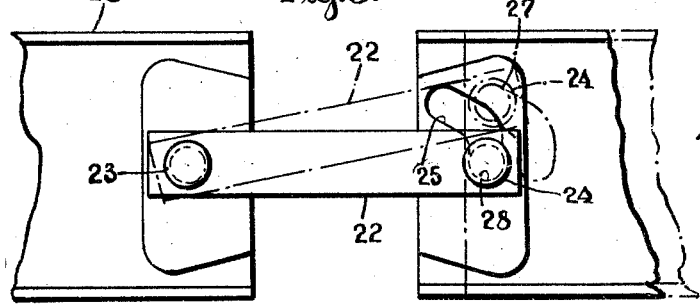
Fig. 3 is a fragmentary plan view showing the spacing member in expanded and locked position.

As best shown in Fig. 3, the diameter of the spacing band can be enlarged, i. e., the band is expanded by positioning the pin 24 within the slot adjacent the end of the band, as indicated at 27. While the spacing member is in expanded condition, it can easily be placed upon the cylindrical base portion of the felloe and the latch is then operated to contract the member about the felloe. When the pin 24 is moved to the other end of the slot, as indicated at 28, the diameter of the spacing member is reduced and consequently it is maintained tightly about the base portion of the felloe. By releasing the latch, the spacing band can easily be removed from the felloe.

An outer rim 29, a counterpart of the inner rim, is disposed oppositely thereto, and has a radially inwardly extending shoulder or abutment 30. A plurality of bolts 32 are threaded into the enlarged portion 15 of the felloe at circumferentially spaced intervals. A plurality of wedging lugs 33 are placed upon the bolts 32 and ordinary nuts 34 are employed to secure the rims upon the felloe. It will be observed that the flanges 20 and 21 of the spacing member engage the rims and serve to maintain them in a predetermined spaced relation.

From the foregoing description, it is apparent that a dual rim assembly has been provided with a novel form of spacing member that facilitates both the application and the removal of rims from a wheel without requiring an appreciable amount of labor or tools other than a simple bar or other element for actuating the latch 22.

Although I have illustrated a preferred form of the invention and have described that form in detail, it is apparent to those skilled in the art that it is not so limited, but that various modifications may be made therein without departing from the spirit of the invention or from the scope of the appended claims.

What I claim is:

1. In a wheel assembly comprising a pair of rims supported by the wheel and a split member disposed between the rims for spacing them, means for expanding, contracting and locking the member comprising a link pivotally secured to one end of the member and having a pin on its free end, the other end of the member having a slot, said slot having a portion extending parallel with the axis of the member and cooperating with the pin for locking the split member in one position, said slot also having a portion directed at an angle to the axially extending portion thereof and cooperating with the pin for contracting and expanding the split member.

2. In a split spacing band of the character described, means for expanding, contracting and locking the band comprising a link pivotally secured to one end of the band, a pin secured to the link, the other end of the band having a slot, said slot having a portion extending parallel with the axis of the band and cooperating with the pin for locking the band in one position, said slot also having a portion directed at an angle to the axially extending portion thereof and cooperating with the pin for contracting and expanding the band.

In witness whereof, I have hereunto signed my name.

Signed at Akron, in the county of Summit and State of Ohio, U. S. A., this 6th day of April, 1929.

ALVA W. WOODWARD.